US010539407B2

(12) United States Patent
Mies (10) Patent No.: US 10,539,407 B2
(45) Date of Patent: Jan. 21, 2020

(54) ROUGHNESS MEASUREMENT SENSOR, AN APPARATUS WITH A ROUGHNESS MEASUREMENT SENSOR AND THE RESPECTIVE USE THEREOF

(71) Applicant: Klingelnberg AG, Zürich (CH)

(72) Inventor: Georg Mies, Wipperfürth (DE)

(73) Assignee: KLINGELNBERG AG (CH)

( * ) Notice: Subject to any disclaimer, the term of this patent is extended or adjusted under 35 U.S.C. 154(b) by 289 days.

(21) Appl. No.: 15/479,963

(22) Filed: Apr. 5, 2017

(65) Prior Publication Data

US 2017/0292823 A1 Oct. 12, 2017

(30) Foreign Application Priority Data

Apr. 6, 2016 (EP) ..................... 16163956

(51) Int. Cl.
*G01B 5/28* (2006.01)
*G01B 5/20* (2006.01)
*G01B 7/34* (2006.01)
*G01B 7/28* (2006.01)

(52) U.S. Cl.
CPC ............... *G01B 5/28* (2013.01); *G01B 5/202* (2013.01); *G01B 7/283* (2013.01); *G01B 7/34* (2013.01); *G01B 7/345* (2013.01)

(58) Field of Classification Search
CPC . G01B 5/28; G01B 7/34; G01B 7/345; G01B 7/283; G01B 5/202
See application file for complete search history.

(56) References Cited

U.S. PATENT DOCUMENTS

| 4,106,333 A | * | 8/1978 | Salje | G01B 5/28 73/105 |
| 4,776,212 A | * | 10/1988 | Parsons | G01B 5/28 73/105 |
| 5,048,326 A | * | 9/1991 | Toida | G01B 5/0002 73/105 |
| 5,136,527 A | * | 8/1992 | Koretz | G01B 7/283 33/504 |
| 2011/0277543 A1 | | 11/2011 | Mies | |

FOREIGN PATENT DOCUMENTS

| DE | 2535912 A1 | 2/1977 |
| DE | 3937207 A1 | 6/1990 |
| DE | 102005007002 A1 | 8/2006 |
| EP | 1589317 A1 | 10/2005 |
| EP | 2199732 A1 | 6/2010 |
| WO | 2010079019 A2 | 7/2010 |

OTHER PUBLICATIONS

Search Report for Application No. EP16163956.2, dated Jul. 13, 2016, 6 pages.

* cited by examiner

*Primary Examiner* — Paul M. West
(74) *Attorney, Agent, or Firm* — McCarter & English, LLP (57) ABSTRACT

A roughness measurement sensor (15), comprising a sliding element and a sensor tip (15.4), wherein the sensor tip (15.4) is arranged in the region of the extremal end of a sensor arm (13.1) which has a longitudinal extension parallel to a longitudinal axis (LA) and is mounted in a lever-like manner. In some embodiments, the sliding element is formed in the manner of a skid (15.3), and the skid (15.3) lies, as viewed in a sectional plane (SE), perpendicularly to the longitudinal axis (LA), laterally adjacent to the sensor tip (15.4).

20 Claims, 5 Drawing Sheets

ROUGHNESS MEASUREMENT SENSOR, AN APPARATUS WITH A ROUGHNESS MEASUREMENT SENSOR AND THE RESPECTIVE USE THEREOF

CROSS REFERENCE TO RELATED APPLICATIONS

This application claims priority under 35 U.S.C. §§ 119(a)-(d) to European application no. EP 16163956.2 filed Apr. 6, 2016, which is hereby expressly incorporated by reference as part of the present disclosure.

FIELD OF INVENTION

The invention relates to a roughness measurement sensor, an apparatus with such a roughness measurement sensor and a respective use thereof.

BACKGROUND

The surface structure of a component or a material is an important quality feature in many technical areas.

There are thus different roughness measurement apparatuses for detecting the roughness or roughness depths of surfaces. A sensor tip is typically guided over the surface in mechanical scanning. The result is a height signal recorded over the scanning path, which is also known as surface profile.

Figure 1A:
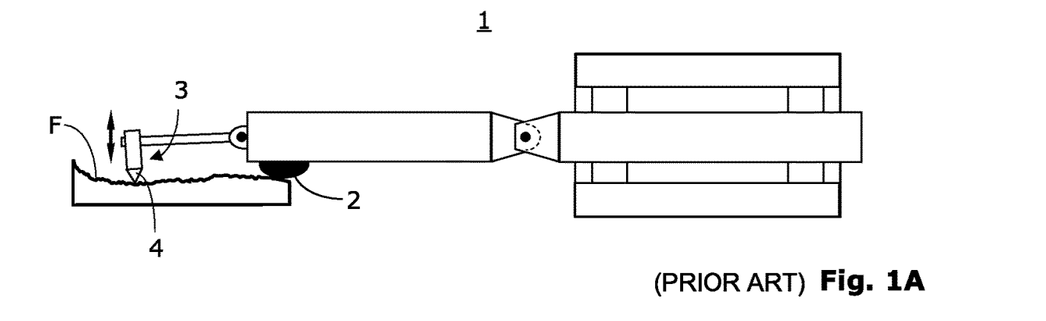
FIG. 1A shows a schematic view of a skid measurement device known from the prior art.

Skid probes 1 are known, as are schematically shown in FIG. 1A. A skid probe 1 comprises a skid 2, which depending on the application has a large or small radius and which is used as a sliding element. The sensor tip 4 of a sensor 3 rests with the skid 2 on a surface F to be measured and detects with the sensor tip 4 the surface profile relative to the path of the skid 2. The skid 2 follows the macroscopic unevenness on the surface F, i.e. the undulation and the macroscopic shape. The sensor tip 4 on the other hand detects with its small tip radius the surface roughness and detects grooves for example which were bridged by the skid 2 because it has a far greater effective radius. The skid 2 thus acts in the manner of a mechanical high-pass filter.

Figure 1B:
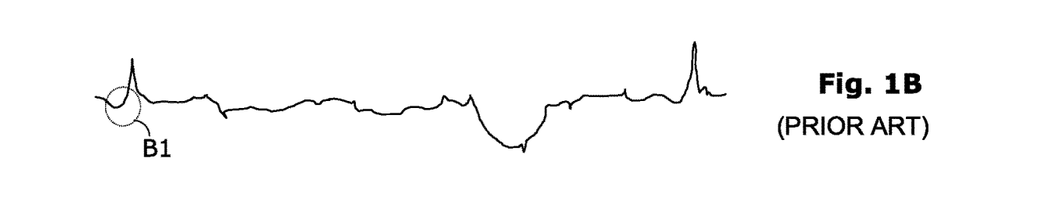
FIG. 1B shows a schematic curve which was recorded by a skid measurement device according to FIG. 1A.

FIG. 1B shows the scanning result of a skid probe 1 of FIG. 1A in the schematic form. The behavior in front of an elevation on the surface F for example is characteristic for a skid probe 1. The skid probe 1 is drawn over the surface F and therefore the skid 2 reaches this elevation before the sensor tip 4. The entire sensor 3 is thus lifted and the sensor tip 4 then protrudes further downwardly from the surrounding sensor housing. This is recorded in a manner (see region B1 in FIG. 1B) as if the sensor tip 4 would apparently run in a depression of the surface F.

Figure 2A:
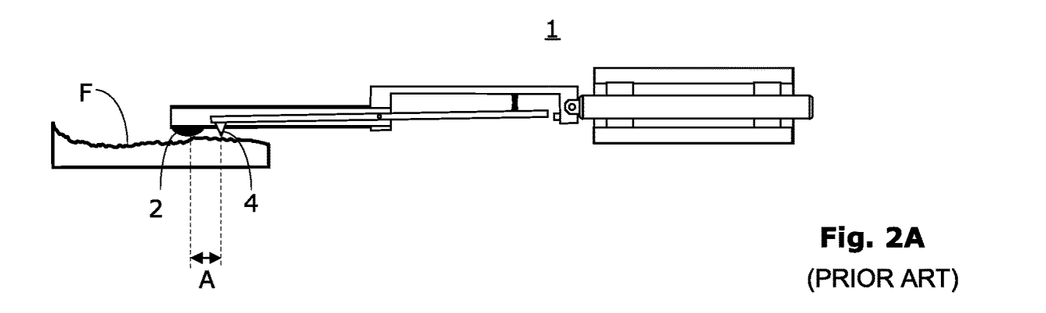
FIG. 2A shows a schematic view of an improved skid measurement device known from the prior art.

An improved skid probe is known from the published patent application WO2010079019A2. Said skid probe is shown in FIG. 2A in a respective functional view. In order to allow a comparison of the improved skid probe of FIG. 2A with the solution of FIG. 1A, the same reference numerals were used in this case. The sliding element 2 is arranged at the extremal end of a sensor pin. The sensor tip 4 is arranged in the sensor pin, wherein the distance A between the sliding element 2 and the sensor tip 4 is fixedly predetermined.

Figure 2B:
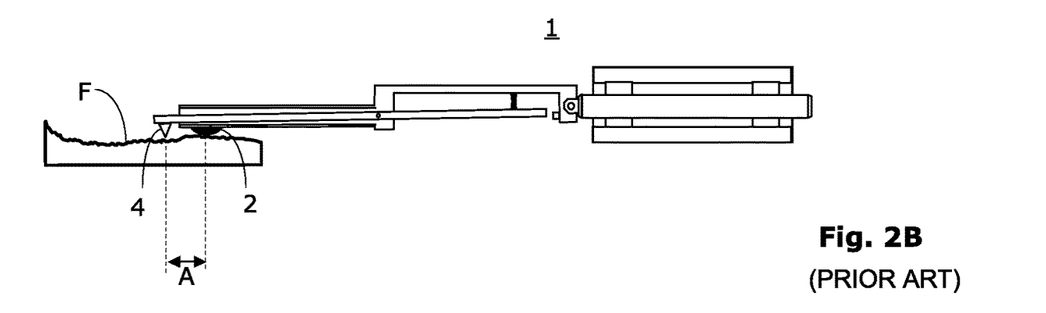
FIG. 2B shows a schematic view of a further skid measurement device which is based on the approach of FIG. 2A.

A further exemplary skid probe 1 is shown in FIG. 2B. The skid probe 1 of FIG. 2B is based on the fundamental principle of FIG. 2A. Other than in FIG. 2A, the sequence of the sensor tip 4 and the sliding element 2 is reversed. In the example shown in FIG. 2B, the sensor tip 4 is situated before the sliding element 2. In this case too, the distance A between the sliding element 2 and the sensor tip 4 is fixedly predetermined.

Skid probes can partly supply distorted results. This is the case for example if the movement of the skid 2 overlaps constructively with the movement of the sensor tip 4 and an output signal is supplied which is too high, or if the movements cancel each other out entirely or in part and thus supply a signal which is too low.

Other problems occur for example when measuring the surface properties of tooth flanks. On the one hand, current skid probes are not capable of entering far into the tooth gaps of small-module gearwheels. On the other hand, the sliding element 2 runs free when the tooth crest of a tooth flank is reached. As a result, the topography of tooth flanks cannot be measured close to the tooth crest. A solution according to FIG. 2A is not suitable because the sensor tip 4 runs empty upon reaching the tooth crest. In a solution according to FIG. 2B on the other hand, the skid 2 would run free upon reaching the tooth crest.

SUMMARY OF THE INVENTION

It is an object of at least some embodiments of the invention to provide a roughness measurement sensor which allows carrying out roughness measurements also on small-module gearwheels and other three-dimensional structures, wherein the greatest possible surface portion of a surface to be measured shall be measured with high precision.

Furthermore, at least some embodiments of the invention relate to providing a (measuring) apparatus with a suitable roughness measurement sensor which allows carrying out improved roughness measurements on gearwheel flanks for example. At least some embodiments of the invention further relate to the use of such a roughness measurement sensor.

It is a further object of at least some embodiments of the invention to be able to carry out roughness measurements at precisely predetermined positions of identical components.

In at least some embodiments, one or more of the above objects is achieved by a roughness measurement sensor according to at least some embodiments disclosed herein, an apparatus according to at least some embodiments disclosed herein and/or by use of a roughness measurement sensor according to at least some embodiments disclosed herein.

In at least some embodiments, a roughness measurement sensor comprises a sliding element and a sensor tip, wherein the sensor tip is arranged at the extremal end of a sensor arm, which has a longitudinal extension parallel to a longitudinal axis and is mounted in a lever-like manner. In at least some embodiments, the sliding element is formed in the manner of a skid, and the skid, as viewed in a sectional plane standing perpendicularly to the longitudinal axis, is arranged laterally adjacent to the sensor tip.

In at least some embodiments, the skid has a great radius on the one hand in order to thus show an effective integration effect in scanning surfaces, and the distance between a lowermost contact point of the sensor tip and a lowermost sliding point of the skid is as small as possible.

In at least some embodiments, the roughness measurement sensor can have an asymmetric configuration in the region of the extremal end of the sensor arm, in which the skid sits only to the right or only to the left laterally adjacent to the sensor tip.

In at least some embodiments, the roughness measurement sensor can also have asymmetric configuration in the region of the extremal end of the sensor arm, in which one skid sits to the right adjacent to the sensor tip and one skid to the left thereof. In at least some embodiments, such a roughness measurement sensor is used in a slightly oblique position so that respectively either only the left or only the right skid is used in combination with the sensor tip.

In at least some embodiments, the skid has a convex surface with a lowermost sliding point, which sliding point is disposed somewhat further to the rear on the skid in the direction of the measuring machine in relation to an end surface/end face of the skid.

In at least some embodiments, the skid has a curved cross-sectional progression as viewed in a cross-sectional plane, wherein the lowermost sliding point defines a zero passage of the curved transversal progression. This means that the curved transversal progression rises to the right and left, originating from the zero passage. Such a solution shows an effective integration effect and good sliding behavior.

In at least some embodiments, the skid has a curved longitudinal progression as viewed in a longitudinal sectional plane, wherein the lowermost sliding point does not lie on the end surface/end face of the skid. Such a solution shows an effective integration effect and good sliding behavior.

In at least some embodiments, the skid has a curved longitudinal progression, which has a first starting point on the end surface/end face of the skid, as viewed in a longitudinal sectional plane. The longitudinal progression extends downwardly from there if one follows rearwardly parallel to the direction of the longitudinal axis in the direction of the measuring machine. In the sectional plane, the longitudinal progression has its lowermost point in the longitudinal sectional plane. In at least some embodiments, after the lowermost point, the longitudinal progression shows a rise if one further follows the direction of the longitudinal axis in a rearwardly parallel manner, wherein, in at least some embodiments, the longitudinal progression opens into a rear end surface/end face of the skid.

An apparatus in accordance with at least some embodiments of the invention comprises a roughness sensor system with a roughness measurement sensor according to at least some embodiments of the invention, wherein the roughness sensor system is especially formed for measuring the surface roughness of the tooth flanks of gearwheels.

In at least some embodiment, a roughness measurement sensor in accordance with at least some embodiments of the invention is especially used for measuring the surface roughness of tooth flanks of gearwheels, wherein the longitudinal axis of the roughness measurement sensor is guided in such a way that it is guided in a flat way over the tooth flank parallel or obliquely to the profile direction.

In at least some embodiments, the invention can be used in connection with 1D, 2D and 3D measuring apparatuses.

BRIEF DESCRIPTION OF DRAWINGS

Embodiments of the invention will be described below in closer detail by reference to the drawings.

DETAILED DESCRIPTION OF EMBODIMENTS

Terms are used in conjunction with the present description which are also used in relevant publications and patents. However, it is to be noted that the use of these terms is only provided for better comprehension. The concepts of the embodiments of the invention and the scope of protection of the patent claims are not to be restricted in the interpretation by the specific selection of the terms. At least some embodiments of the invention may be readily transferred to other term systems and/or technical fields. The terms are to be applied accordingly in other technical fields.

The term roughness is used in this case to designate the surface quality of a surface F. The roughness is rather limited to microscopic, within the terms of punctiform or local statements. Structures, elements and features of a surface F are typically concerned in connection with roughness, which have a magnitude in the range of nm up to approximately 500 µm. In particular, the measurement of the surface of the tooth flanks of gearwheels 11 and similar products is concerned in this case.

In order to allow the evaluation or scanning of the surface F, e.g. the tooth flank of a tooth 7 (also see FIG. 4), it is necessary to typically scan several measuring points along a line, curve or surface F.

FIGS. 3A to 3D show details of a roughness measurement sensor 15 according to at least some embodiments of the invention. The roughness measurement sensor 15 comprises a sliding element 15.3, which will be explained below in closer detail, and a sensor tip 15.4. The sensor tip 15.4 is disposed in the region of the extremal end of a sensor arm 13.1. The sliding element 15.3 is disposed as closely as possible laterally adjacent to the sensor tip 15.4.

The sensor arm 13.1, in at least some embodiments is characterized in that it has a longitudinal extension parallel to a longitudinal axis LA. In at least some embodiments, the sensor arm 13.1 is long and narrow (e.g. in that it has a low diameter D1, as shown in FIG. 3E), such that the roughness measurement sensor 15 can penetrate up to a tooth root 8 (see FIG. 4) in a narrow tooth gap between adjacent teeth 7.

The roughness measurement sensor 15 further comprises a lever-like bearing in at least some embodiments, which is formed to translate minor deflections of the sensor tip 15.4 in the z-direction into respective deflections at an opposite end of a lever arm. A lever-like bearing of the sensor arm 13.1 can be provided in this case in at least some embodiments, which bearing carries out a mechanical 1:1 conversion of the deflections of the sensor tip 15.4 in the z-direction. However, a lever-like bearing of the sensor arm 13.1 can also be provided in at least some embodiments, which bearing carries out an increasing translation of the deflections of the sensor tip 15.4 in the z-direction. In this case, a miner deflection of the sensor tip 15.4 in the z-direction is translated into a greater deflection of the opposite end of the sensor arm 13.1 in the z-direction. It is also possible to provide a step-down of the lever-like bearing in at least some embodiments.

Depending on the embodiment, the sensor arm 13.1 can be mounted in a lever-like manner (e.g. in the interior of a housing 19) or a different section of the roughness measurement sensor 15 (e.g. a hollow cylinder 13.3) can be used for accommodating the lever-like bearing of the sensor arm 13.1.

Figure 3A:
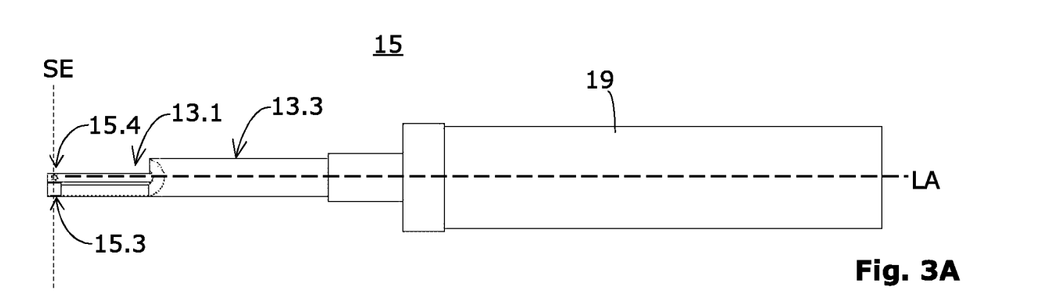
FIG. 3A shows a bottom schematic view of a roughness measurement sensor according to at least some embodiments of the invention.
Figure 3B:
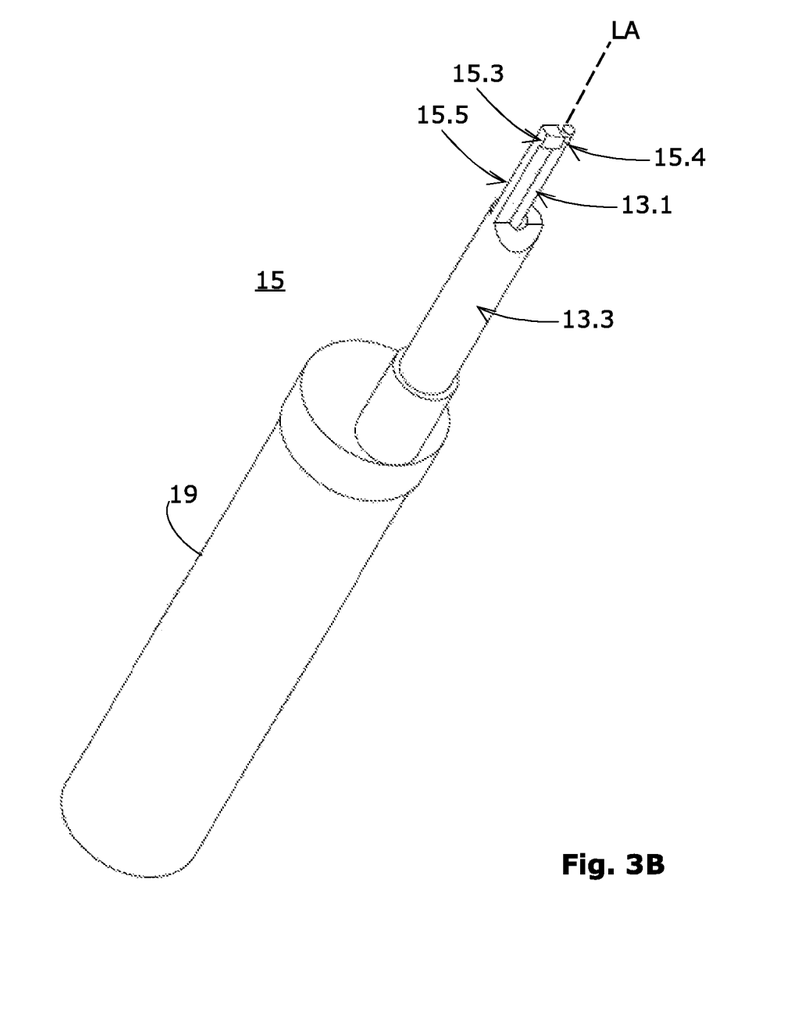
FIG. 3B shows a schematic perspective view of the roughness measurement sensor of FIG. 3A obliquely from below.
Figure 3C:
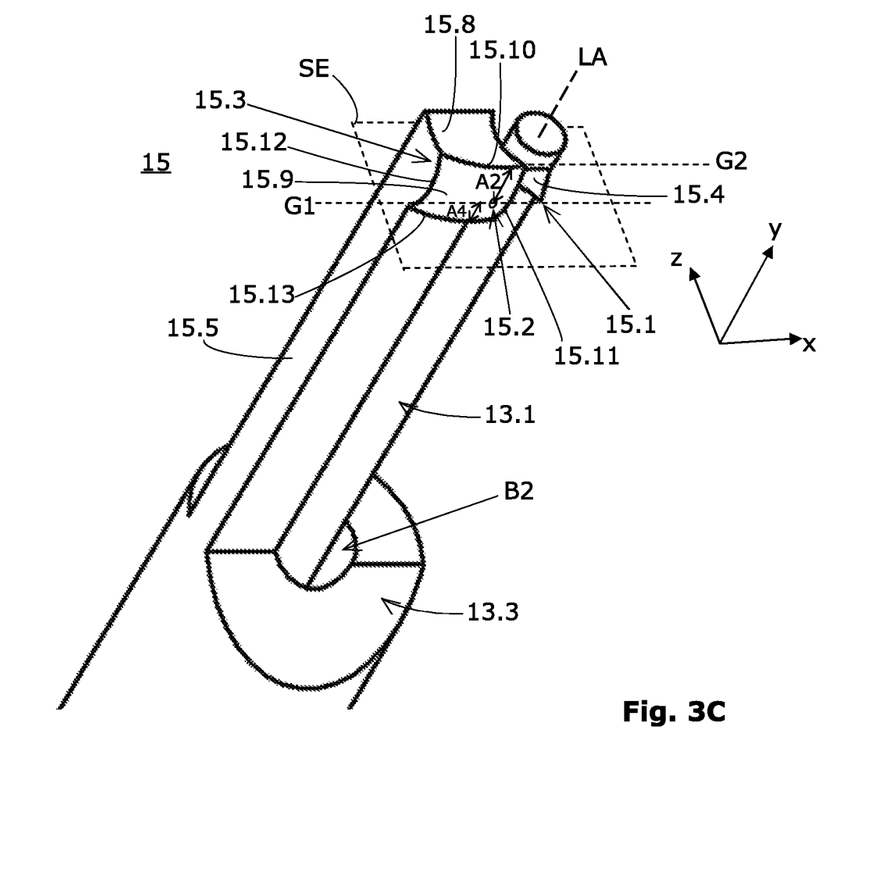
FIG. 3C shows a schematic enlarged view of FIG. 3B.

According to at least some embodiments of the invention, the sliding element is formed in the manner of a skid 15.3, as shown in FIGS. 3A to 3D by reference to a first example Said skid 15.3 is arranged in at least some embodiments laterally adjacent to the sensor tip 15.4. The term "laterally adjacent" relates in this case to a plane of intersection SE, which stands perpendicularly to the longitudinal axis LA. This plane of intersection SE is schematically indicated in FIG. 3C. The lateral arrangement of the skid 15.3 adjacent to the sensor tip 15.4 is shown in closer detail in a first embodiment in FIG. 3D and the lateral arrangement of the skid 15.3 adjacent to the sensor tip 15.4 of a second embodiment in FIG. 3E.

In at least some embodiments, the sensor arm 13.1 can have the shape of a hollow cylinder (see FIG. 3E) or a full cylinder (see FIG. 3D) at least in the region of its extremal end. The sensor arm 13.1 can also have any other suitable rod shape in at least some embodiments. That is why references is made to a rod-shaped, elongated sensor arm 13.1.

The sensor arm 13.1 can extend in at least some embodiments into the interior of a hollow cylinder 13.3 for example, which can be arranged at least partly in a hollow or open manner in order to realize a lever-arm bearing in its interior, by means of which the sensor arm 13.1 is mounted in a lever-like manner.

The sensor arm 13.1 can extend in at least some embodiments completely through the interior of a hollow cylinder 13.3 for example, which is formed in a completely hollow manner. In this case, in at least some embodiments, the sensor arm 13.1 extends completely through the hollow cylinder 13.3 in order to be subsequently mounted in a lever-like manner in the interior of a housing 19 for example.

The sensor tip 15.4 can sit in at least some embodiments on the outer circumference of said rod-shaped, elongated sensor arm 13.1, as shown in FIGS. 3A to 3D.

In at least some embodiments, the sensor tip 15.4 extends in a radial direction, relating to the longitudinal axis LA.

The sensor tip 15.4 can partly or fully penetrate the sensor arm 13.1 in at least some embodiments. An embodiment is shown in FIG. 3E in which the sensor arm 13.1 is formed at least in the region of the front extremal end as a hollow cylinder and in which the sensor tip 15.4 completely penetrates the sensor arm 13.1. FIG. 3E shows an embodiment in which the sensor tip 15.4 fully penetrates the sensor arm 13.1, which can be recognized such that the rear end 15.5 of the sensor tip 15.4 protrudes upwardly out of the sensor arm 13.1.

The sensor tip 15.4 can comprise a tip for example, which, as can be recognized in FIGS. 3C and 3E, defines a point (known as lowermost contact point 15.1 of the sensor tip 15.4) which lies on a straight line G1, when the skid 15.3 and the sensor tip 15.4 sit on an ideally smooth surface F, as shown in FIG. 3E (the surface F coincides in this case with the straight line G1). Based on said lowermost contact 15.1, the sensor tip 15.4 can have a triangular or pyramidal shape for example, which converges in the region of the sensor arm 13.1 into a rectangular or square plate 15.7, which extends on its part to the aforementioned rear end 15.5 (see FIG. 3E).

In at least some embodiments, however, the sensor tip 15.4 can have a conical (cone-shaped) shape in the lowermost region (close to the lowermost contact point 15.1), which converges upwardly into a cylindrical region.

In at least some embodiments, the sensor tip 15.4 defines the aforementioned lowermost contact point 15.1 of the sensor tip 15.4 (see FIG. 3C or 3E). As viewed in a cross-sectional plane (which can coincide in at least some embodiments with the plane of intersection SE), which stands perpendicularly to the longitudinal axis LA, the skid 15.3 in at least some embodiments has the progression of a circular arc with a lowermost sliding point 15.2, as shown in FIG. 3C by a small circle on a straight line G1. The lowermost contact point 15.1 and the lowermost sliding point 15.2 are also clearly shown in FIG. 3E.

Said lowermost sliding point 15.2 lies in at least some embodiments together with the lowermost contact point 15.1 on the common straight line G1 (if the skid 15.3 and the sensor tip 15.4 rest on an ideally smooth surface F). Said straight line G1 lies in a cross-sectional plane and it can extend horizontally (i.e. parallel to the X-axis) in at least some embodiments, as shown in FIG. 3E.

It can be stated in general that the straight line G1 extends perpendicularly to the longitudinal axis LA.

In at least some embodiments, skid 15.3 has a convex curved progression as viewed in a longitudinal sectional plane and/or a convex curved progression as viewed in a cross-sectional plane. The longitudinal sectional plane is a plane which extends parallel to the longitudinal axis LA. The cross-sectional plane stands perpendicularly to the longitudinal axis LA.

In at least some embodiments, the skid 15.3 has a convex surface with a lowermost sliding point 15.2, which sliding point is disposed in relation to an end surface/end face 15.8 of the skid 15.3 somewhat further back (in the direction of the measurement machine) on the skid 15.3. Details in this respect are shown in FIG. 3C for example. FIG. 3C indicates the position of a front corner point P2 of the end surface/end face 15.8 of the skid 15.3 through a straight line G2, which extends parallel to the straight line G1. If the two straight lines G1 and G2 are projected into a common XY-plane, it can be recognized that the straight line G2 lies before the straight line G1.

Further details are shown in FIG. 3E. The details of the embodiment of FIG. 3E can also be applied to the embodiment of FIGS. 3A to 3D. The straight line G2 is also shown in FIG. 3E. If the two straight lines G1 and G2 are projected into a common XZ-plane, it can be recognized that the straight line G2 lies above the straight line G1, i.e. the corner point P2 is offset somewhat to the back in relation to the lowermost sliding point 15.2 and in relation to the lowermost contact point 15.1 (i.e. offset in the upward direction).

In at least some embodiments, skid 15.3 has a curved transverse progression as viewed in a cross-sectional plane, wherein the lowermost sliding point 15.2 defines a zero passage P1 of the curved transverse progression. The cross-sectional plane lies transversely to the longitudinal axis LA, i.e. the cross-sectional plane lies parallel to the XZ plane.

Figure 3D:
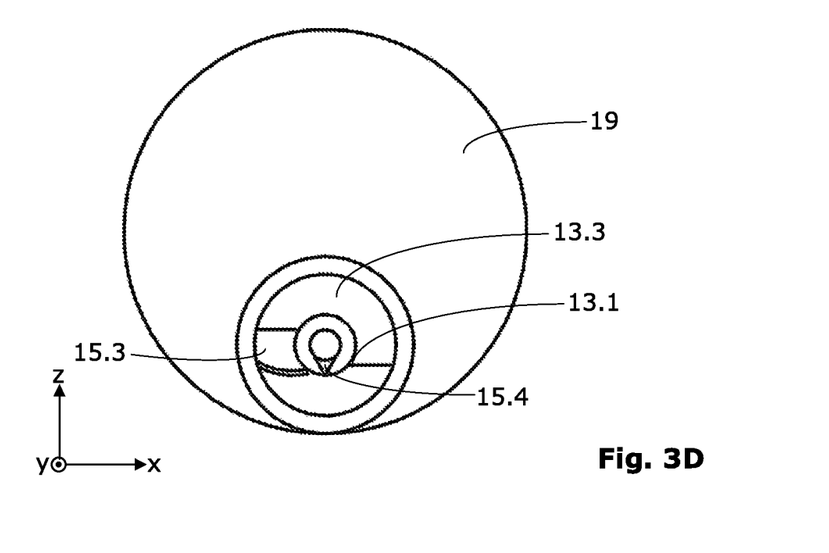
FIG. 3D shows a schematic enlarged front view of the roughness measurement sensor of FIG. 3A.
Figure 3E:
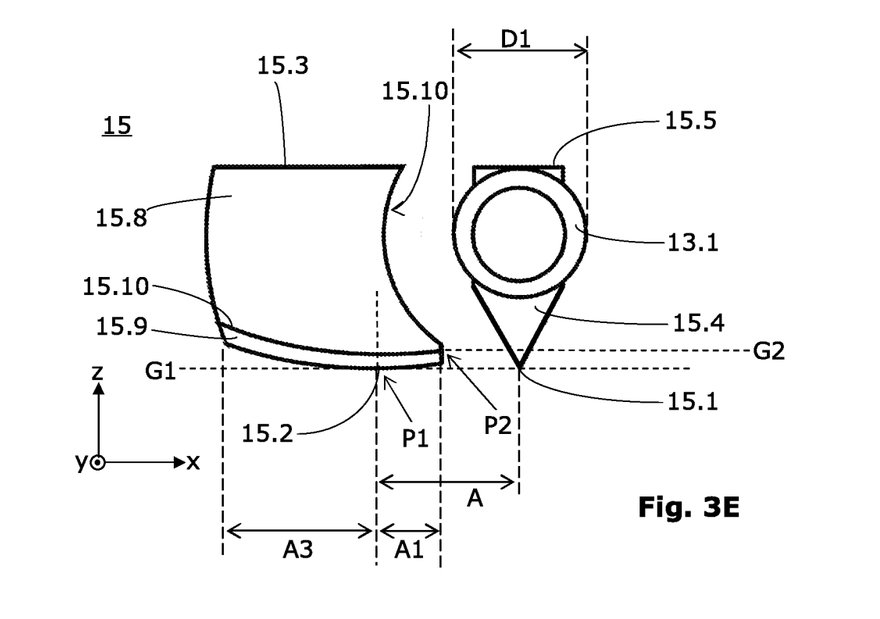
FIG. 3E shows a schematic enlarged front view of a further roughness measurement sensor, wherein only the skid and the sensor arm with the sensor tip are shown in this case.

The curved transverse progression rises to the right and to the left, originating from the zero passage P1, as shown in FIGS. 3D and 3E. These embodiments are characterized in that the skid 15.3 has the greatest possible radius in the direct vicinity of the lowermost sliding point 15.2 (in order to show the desired integration effect) on the one hand and that on the other hand the lateral distance A from the lowermost contact point 15.1 is as small as possible. Moreover, these embodiments produce a good sliding effect because the skid 15.3 is not guided with a longitudinal and/or transverse edge over the surface F but with the direct vicinity of the lowermost sliding point 15.2.

In at least some embodiments, skid 15.3 has a curved longitudinal progression as viewed in a longitudinal sectional plane, which progression lies parallel to the YZ plane. The lowermost sliding point 15.2 does not rest on the end surface/end face 15.8 of the skid 15.3, but that the lowermost sliding point 15.2 lies in the region of the curved bottom side 15.9 of the skid 15.3. A strip of the curved bottom side 15.9 is shown in FIG. 3E. FIG. 3C shows the curved bottom side 15.9 in its entirety.

In at least some embodiments, skid 15.3 has a curved longitudinal progression, which progression, as viewed in a longitudinal sectional plane, has a first starting point at the end surface/end face 15.8 of the skid 15.3. The longitudinal progression extends downwardly from there, if one follows the direction of the longitudinal axis LA in a rearward parallel manner. In the plane of intersection SE, the longitudinal progression has its lowermost point on the line of intersection with the longitudinal sectional plane. In at least some embodiments, after the lowermost point, the longitudinal progression shows a rise, if the direction of the longitudinal axis LA is followed further in a rearward parallel manner, wherein in at least some embodiments, the longitudinal progression leads to a rearward end surface/end face of the skid 15.3.

The skid 15.3 can further comprise a corner point P2 in at least some embodiments, as viewed in a longitudinal sectional plane, which corner point is upwardly offset to the rear in relation to the lowermost sliding point 15.2 (i.e. parallel to the Z-axis). Said corner point P2 is shown in FIG. 3E.

As already mentioned above, the lowermost sliding point 15.2 should have the greatest possible radius due to the integration effect. Furthermore, the lowermost sliding point 15.2 should not directly sit on an edge of the skid 15.3 because the skid 15.3 otherwise has the tendency to be guided along said edge over the surface F. The integration effect would be reduced in this case and the sliding behavior would not be advantageous. That is why, in at least some embodiments, the lowermost sliding point 15.2 has a lateral distance A1 (parallel to the X-axis) from a bottom longitudinal edge 15.11 of the skid 15.3 and a longitudinal distance A2 (parallel to the Y-axis) from a bottom transverse edge 15.10 of the skid 15.3. The longitudinal distance A2 is shown in FIG. 3C. The lateral distance A1 is shown in FIG. 3E.

In addition, in at least some embodiments, the lowermost sliding point 15.2 also has a lateral distance A3 from the outer bottom longitudinal edge 15.12 (which is shown in FIG. 3C to the left on the skid 15.3) and a distance A4 from a bottom transverse edge 15.13 (which is shown in FIG. 3C to the rear on the skid 15.3).

In at least some embodiments, skid 15.3 has a concave wall surface 15.10, which wall surface extends in a substantially equidistant manner in relation to the outer jacket surface of the sensor arm 13.1. FIG. 3E shows the concave wall surface 15.10. This constellation allows an especially short distance between the skid 15.3 and the sensor arm 13.1 and a mechanically sturdy configuration.

As is shown in FIGS. 3A to 3C, which shall be understood by way of example, in at least some embodiments, the roughness measurement sensor 15 has a longitudinal shape, at the front region of which the skid 15.3 and the sensor tip 15.4 are situated adjacent to each other. The roughness measurement sensor 15 is formed to be moved in a direction which extends parallel to the longitudinal axis LA or slightly obliquely in relation to the longitudinal axis LA. In at least some embodiments, roughness measurement sensor 15 is drawn, but it can also be pushed.

In at least some embodiments, the roughness measurement sensor 15 has a longitudinal shape, which tapers towards the front region, as shown in FIG. 3A for example. In at least some embodiments, the roughness measurement sensor 15 can be composed from several elements, which have an increasingly smaller diameter towards the front region.

In order to ensure that the sensor tip 15.4 can be deflected in the z-direction independently of the skid 15.3 when the roughness measurement sensor 15 is guided over a surface F, the skid 15.3 is rigidly connected to a housing 19 for example, while the sensor arm 13.1, at the extremal end of which the sensor tip 15.4 is situated, extends into the interior of a hollow cylinder 13.3 for example FIGS. 3B and 3C show that the skid 15.3 can sit on an elongated body, which is mechanically connected to the hollow cylinder 13.3 for example. In this case, the sensor arm 13.1 is movably mounted in the interior of the hollow cylinder 13.3. It is shown in the region B2 in FIG. 3C how the sensor arm 13.1 extends into the interior of the hollow cylinder 13.3.

Figure 5:
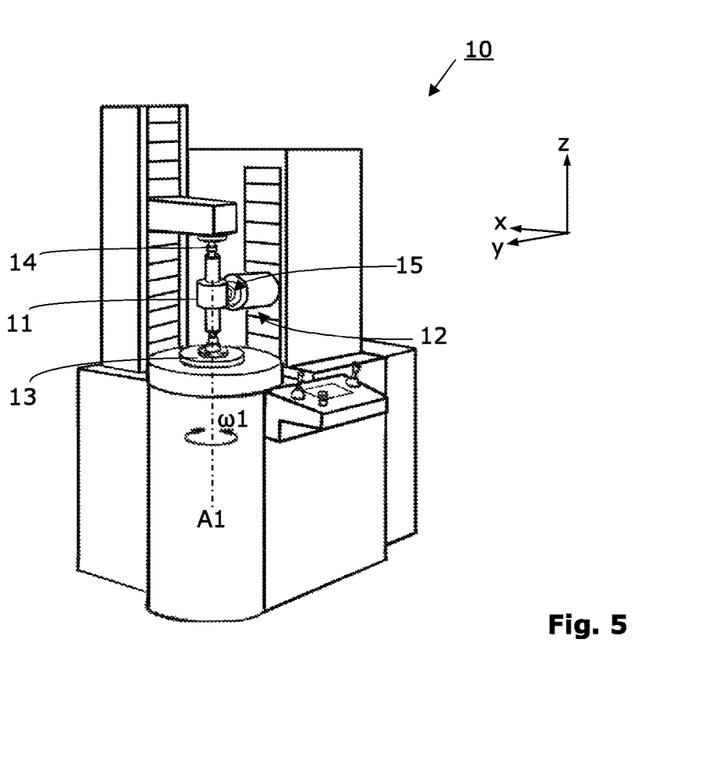
FIG. 5 shows a perspective view of an apparatus (here in form of a CNC measuring device) which is fitted with a roughness measurement sensor according to at least some embodiments of the invention.

In at least some embodiments, since both the skid 15.3 and also the sensor tip 15.4 are subjected to wear and tear, both elements 15.3, 15.4 are formed to be exchangeable. The roughness measurement sensor 15 can therefore be connected to an apparatus 10 (e.g. in form of a measuring device, as shown in FIG. 5) via an adapter plate 15.6.

The roughness measurement sensor 15 according to at least some embodiments of the invention can be connected in at least some embodiments to a (spring) parallelogram structure which is used as an articulated chain, as described in the patent EP1589317 B1 (shown there in FIG. 2A) or in the initially mentioned patent application WO2010079019A2 (shown there in FIG. 6).

Figure 4:
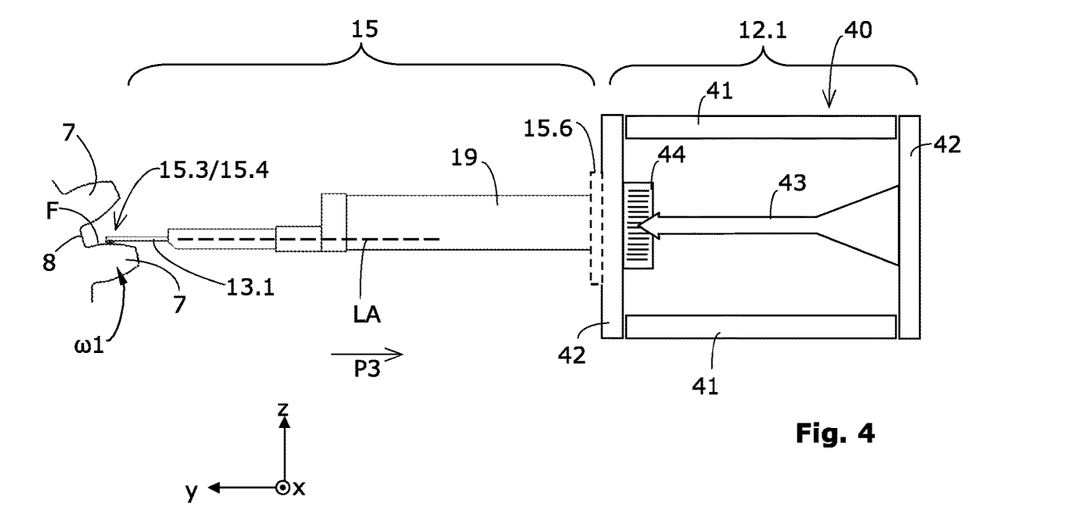
FIG. 4 shows the schematic configuration of a one-coordinate sensor head with the roughness measurement sensor of FIG. 3A.

FIG. 4 shows a schematic configuration for the connection of the roughness measurement sensor 15 to a (spring) parallelogram structure 12.1 of a (roughness) sensor system 12.

According to at least some embodiments of the invention, the roughness measurement sensor 15 plus the skid 15.3 and the sensor tip 15.4 are moved jointly over the surface F to be scanned. Two teeth 7 of a spur gear are shown in FIG. 4, wherein the surface F of a flank is scanned here.

The skid 15.3 and the sensor tip 15.4 are pulled or pushed during the measurement of the roughness of the surface F to be scanned. The sensor tip 15.4 is disposed at a short distance A (see FIG. 3E) adjacent to the lowermost sliding point 15.2 of the skid 15.3. In the lateral view of FIG. 4, the sensor tip 15.4 is situated spatially in front of the skid 15.3.

In at least some embodiments, the distance A can be between 0.1 mm and 1.5 mm.

In at least some embodiments, the sensor tip 15.4 is mounted in a floating, lever-arm-like manner in order to enable the scanning or measurement of structures, elements and features of the surface F which have a size in the range of nm up to approx. 500 μm.

In the embodiment shown in FIG. 4, the measurement sensor 15 sits on a parallelogram structure 40. The measurement sensor 15 can optionally be connected via an (adapter) plate 15.6 to the spring parallelogram structure 40, as mentioned above. The optional (adapter) plate 15.6 is shown with the dashed line.

The measurement sensor 15 can also be connected in a different manner however, for example to a movable measurement axis or to a sensor head base of an apparatus 10. In at least some embodiments, the measurement sensor 15 can also be attached to a spring hinge.

The parallelogram structure 40 can comprise two parallel elements 41 and two other parallel elements 42 which stand perpendicularly thereto. The rear element 42 can be used as a reference base. In this case, the rear element 42 is connected to the turret or the sensor head base of an apparatus 10 (e.g. a coordinate measurement system of FIG. 5). An indicator element 43 or cantilever arm can be present on the reference base. If the skid 15.3, plus the adjacent sensor tip 15.4, is deflected parallel to the z-direction, the front element 42 is displaced in the XZ plane. This lateral movement in the XZ plane is expressed in a relative movement of the indicator element 43 or the cantilever arm with respect to a 1D measurement transducer 44. Said measurement transducer 44 is shown in form of a linear scale in a stylized manner. The measurement transducer 44 can thus supply a signal which permits a statement on the (macroscopic) shape of the surface F.

The apparatus 10 (e.g. a coordinate measurement system of FIG. 5) can move the skid 15.3 radially towards a component to be checked for example, wherein the longitudinal axis LA has a horizontal position. Furthermore, the apparatus 10 can rotate or move the component 11 in this process until the skid 15.3 touches it on a predeterminable surface F. This rotational movement of the component 11 is indicated in FIG. 4 by the double arrow with the designation ω1.

The curved tooth surface F of the tooth 7 of the component 11 can thus be scanned for example in a starting point (e.g. close to the tooth root 8). For this purpose, the measurement sensor 15 can be advanced by means of an advancing movement of the apparatus 10 in the X-Y-Z coordinate system and is deflectable as a result of the special parallelogram structure in one, two or all three coordinate directions X, Y, Z of the space, wherein these deflections generate signals.

The skid 15.3 is now moved from the starting point up to an endpoint over the surface F (e.g. up to a point which lies close to the tooth head of the tooth 7). In at least some embodiments, the skid 15.3 is drawn over this surface F, as indicated in FIG. 4 by the arrow P3. When the skid 15.3 is drawn, the sensor tip 15.4 runs adjacent to said skid. In order to follow the shape of the tooth flank of the tooth 7, the apparatus 10 can carry out a coordinated rotational movement oil so that the (roughness) measurement sensor 15 is guided in a flat manner (e.g. tangentially) in the profile direction over the tooth flank.

The apparatus 10 can supply two output signals for example, which are correlated. The first output signal originates from scanning the surface F with the skid 15.3 for example. The second output signal originates from the sensor tip 15.4 for example. These signals are in correlation with respect to each other, both spatially and also temporally, and allow making statements on the structure of the surface F.

In at least some embodiments, with the described measurement arrangement the apparatus 10 can detect all deflections of the skid 15.3 along a straight line for example (in the case of a 1D measurement), in an XZ plane (in the case of a 2D measurement), and in the space determined by the three coordinate directions X, Y and Z (in the case of a 3D measurement). The deflections in the Z-plane can be detected by a 1D measurement device, as shown in FIG. 4 for example.

An advantageous embodiment of at least some embodiments of the invention which is shown in FIG. 5 concerns a fully automatic, CNC-controlled measuring device 10 which is fitted with a measurement sensor 15 according to at least some embodiments of the invention. The measuring device 10 is suitable for testing the surface roughness, the shape and geometry of spur gear toothings, as well as cutting wheels and shaving cutters, worms and worm gears, hob cutters, bevel gears and general deviations with respect to dimensions, shapes and positions of the rotationally symmetric components 11, for measuring lobed shafts and camshafts, or also for measuring rotors, to name a few of the possibilities for the use thereof.

In at least some embodiments, the measuring device 10 comprises a driver 13 that can be driven via a triggering means (not shown) and a centering means 14, wherein the driver 13 and the centering means 14 are arranged in such a way that a component 11 to be measured can be clamped coaxially between the driver 13 and the centering means 14, as is shown in FIG. 5 on the basis of a stylized cylinder gear 11.

As is shown in FIG. 5, in at least some embodiments, the measuring device 10 comprises at least one measurement sensor 15 for the one-dimensional, two-dimensional or three-dimensional measurement of the component 11 clamped in the measuring device 10. In at least some embodiments, a sensor system 12 with a (spring) parallelogram structure 12.1 is provided, which is displaceable with respect to height (parallel to the Z-axis). Furthermore, the measurement sensor 15 can carry out further advancing movements (in at least some embodiments, a four-axis contouring control of the measuring device 10 is used in this case). The aforementioned rotational movement oil concerns a rotation which is carried out about the A1 axis of the measuring device 10.

Depending on the embodiment, signals can be generated both by the skid 15.3 which is connected via the housing 19 to the parallelogram structure 40 and also by the sensor tip 15.4 which is integrated in the roughness measurement sensor 15.

Further details on the precise functionality of the apparatus 10 are disclosed in the published patent application EP2199732A1 and corresponding U.S. Patent Application Publication No. 2011/0277543, each of which is hereby expressly incorporated by reference as part of the present disclosure.

It should be understood that the features disclosed herein can be used in any combination or configuration, and is not limited to the particular combinations or configurations expressly specified or illustrated herein. Thus, in some embodiments, one or more of the features disclosed herein may be used without one or more other feature disclosed herein. In some embodiments, each of the features disclosed herein may be used without any one or more of the other features disclosed herein. In some embodiments, one or more of the features disclosed herein may be used in combination with one or more other features that is/are disclosed (herein) independently of said one or more of the features. In some embodiments, each of the features disclosed (herein) may be used in combination with any one or more other feature that is disclosed herein.

Unless stated otherwise, terms such as, for example, "comprises," "has," "includes," and all forms thereof, are considered open-ended, so as not to preclude additional elements and/or features.

Also unless stated otherwise, terms such as, for example, "a," "one," "first," are considered open-ended, and do not mean "only a," "only one" and "only a first," respectively. Also unless stated otherwise, the term "first" does not, by itself, require that there also be a "second."

Also, unless stated otherwise, the phrase "A and/or B" means the following combinations: (i) A but not B, (ii) B but not A, (iii) A and B. It should be recognized that the meaning of any phrase that includes the term "and/or" can be determined based on the above. For example, the phrase "A, B and/or C" means the following combinations: (i) A but not B and not C, (ii) B but not A and not C, (iii) C but not A and not B, (iv) A and B but not C, (v) A and C but not B, (vi) B and C but not A, (vii) A and B and C. Further combinations using and/or shall be similarly construed.

As may be recognized by those of ordinary skill in the pertinent art based on the teachings herein, numerous changes and modifications may be made to the above-described and other embodiments without departing from the spirit and/or scope of the invention. Accordingly, this detailed description of embodiments is to be taken in an illustrative as opposed to a limiting sense.

What is claimed is:

1. A roughness measurement sensor comprising:
   a sliding element defined by a skid and a sensor tip, wherein the sensor tip is located near an extremal end of a sensor arm, the sensor arm being mounted in a lever configuration and including a longitudinal extension extending parallel to a longitudinal axis of the roughness measurement sensor, wherein:
   the skid, as viewed in a plane of intersection perpendicular to the longitudinal axis, is laterally adjacent to the sensor tip;
   the sensor tip, as viewed in a cross-sectional plane perpendicular to the longitudinal axis, defines a lowermost contact point,
   the skid, as viewed in said cross-sectional plane, has a curved progression including a lowermost sliding point, and
   the roughness measurement sensor is configured to move along a line of a surface with the sensor tip in a direction extending parallel to the longitudinal axis, wherein the sliding point of the skid is laterally offset from the line.

2. A roughness measurement sensor according to claim 1, wherein the sensor arm is rod-shaped near the extremal end, and the sensor tip is located on an outer circumference of the rod-shape.

3. A roughness measurement sensor according to claim 2, wherein the sensor tip extends in a radial direction relative to the longitudinal axis.

4. A roughness measurement sensor according to claim 2, wherein the sensor tip penetrates the rod-shape either in part or in full.

5. A roughness measurement sensor according to claim 1, wherein the lowermost sliding point of the skid defines a lateral distance from a bottom longitudinal edge of the skid, and a longitudinal distance from a bottom transverse edge of the skid.

6. A roughness measurement sensor according to claim 1, wherein the skid, as viewed in a longitudinal sectional plane, has a convex curved progression including a point in which an ascending gradient of the curved progression is equal to zero.

7. A roughness measurement sensor according to claim 6, wherein said point in which an ascending gradient of the curved progression is equal to zero lies in a same cross-sectional plane as a lowermost contact point of the sensor tip.

8. A roughness measurement sensor according to claim 1, wherein the roughness measurement sensor comprises a region that is at least partly hollow or open to accommodate a lever-arm bearing by which the sensor arm is mounted in the lever configuration.

9. A roughness measurement sensor according to claim 1, wherein the roughness measurement sensor has an asymmetric configuration near the extremal end of the sensor arm, and wherein the skid is seated laterally to a right or a left of the sensor tip.

10. A roughness measurement sensor according to claim 1, wherein the roughness measurement sensor has a symmetric configuration near the extremal end of the sensor arm, and wherein the skid is seated laterally to a right of the sensor tip and a second skid is seated laterally to a left of the sensor tip.

11. An apparatus comprising:
    a roughness sensor system for measuring the surface roughness of the tooth flanks of gearwheels;
    the system including a roughness measurement sensor comprising:
    a sliding element defined by a skid and a sensor tip, wherein the sensor tip is located near an extremal end of a sensor arm, the sensor arm being mounted in a lever configuration and including a longitudinal extension extending parallel to a longitudinal axis of the roughness measurement sensor, wherein:
    the skid, as viewed in a plane of intersection perpendicular to the longitudinal axis, is laterally adjacent to the sensor tip;
    the sensor tip, as viewed in a cross-sectional plane perpendicular to the longitudinal axis, defines a lowermost contact point,
    the skid, as viewed in said cross-sectional plane, has a curved progression including a lowermost sliding point, and
    the roughness measurement sensor is configured to move along a line of a surface with the sensor tip in a direction extending parallel to the longitudinal axis, wherein the sliding point of the skid is laterally offset from the line.

12. An apparatus according to claim 11, the apparatus further comprising one or more sensor axes for guidance of the longitudinal axis of the roughness measurement sensor in a flat manner in a profile direction along a tooth flank during the measurement of the surface roughness of the tooth flanks of gearwheels.

13. An apparatus according to claim 11, wherein the sensor arm is rod-shaped near the extremal end, and the sensor tip is located on an outer circumference of the rod-shape.

14. An apparatus according to claim 13, wherein the sensor tip extends in a radial direction relative to the longitudinal axis.

15. A roughness measurement sensor according to claim 13, wherein the sensor tip penetrates the rod-shape either in part or in full.

16. A method comprising:
measuring a surface roughness of tooth flanks of gear wheels using a roughness measurement sensor, wherein the roughness measurement sensor comprises:
- a sliding element defined by a skid and a sensor tip, wherein the sensor tip is located near an extremal end of a sensor arm, the sensor arm being mounted in a lever configuration and including a longitudinal extension extending parallel to a longitudinal axis of the roughness measurement sensor, wherein:
  - the skid, as viewed in a plane of intersection perpendicular to the longitudinal axis, is laterally adjacent to the sensor tip;
  - the sensor tip, as viewed in a cross-sectional plane perpendicular to the longitudinal axis, defines a lowermost contact point,
  - the skid, as viewed in said cross-sectional plane, has a curved progression including a lowermost sliding point, and
  - the roughness measurement sensor is configured to move along a line of a surface with the sensor tip in a direction extending parallel to the longitudinal axis, wherein the sliding point of the skid is laterally offset from the line; and
- the method further comprises guiding the longitudinal axis of the roughness measurement sensor in a flat manner in a profile direction along a tooth flank.

17. A method according to claim 16, wherein said guiding the longitudinal axis of the roughness measurement sensor in a profile direction along a tooth flank comprises drawing the measurement sensor from a starting point near a tooth root to an end point near a tooth head.

18. A method according to claim 16, wherein the sensor arm is rod-shaped near the extremal end, and the sensor tip is located on an outer circumference of the rod-shape.

19. A method according to claim 18, wherein the sensor tip extends in a radial direction relative to the longitudinal axis.

20. A method according to claim 18, wherein the sensor tip penetrates the rod-shape either in part or in full.

* * * * *